US010674513B2

(12) United States Patent
Hahn et al.

(10) Patent No.: US 10,674,513 B2
(45) Date of Patent: *Jun. 2, 2020

(54) BSS COLOR ASSIGNMENT IN A WIRELESS LOCAL AREA NETWORK

(71) Applicant: Hewlett Packard Enterprise Development LP, Houston, TX (US)

(72) Inventors: Dongwoon Hahn, San Jose, CA (US);
Sachin Ganu, San Jose, CA (US);
Eldad Perahia, Park City, UT (US);
Gaurav Patwardhan, Santa Clara, CA (US)

(73) Assignee: Hewlett Packard Enterprise Development LP, Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/541,230

(22) Filed: Aug. 15, 2019

(65) Prior Publication Data

US 2020/0059932 A1 Feb. 20, 2020

Related U.S. Application Data

(63) Continuation of application No. 16/103,915, filed on Aug. 14, 2018, now Pat. No. 10,397,928.

(51) Int. Cl.
*H04W 74/00* (2009.01)
*H04W 72/04* (2009.01)
(Continued)

(52) U.S. Cl.
CPC ......... *H04W 72/0453* (2013.01); *H04L 41/22* (2013.01); *H04W 8/005* (2013.01); *H04W 16/20* (2013.01); *H04W 84/12* (2013.01)

(58) Field of Classification Search
CPC . H04W 84/12; H04W 72/0453; H04W 88/06; H04W 16/02; H04W 16/04;
(Continued)

(56) References Cited

U.S. PATENT DOCUMENTS 6,421,528 B1* 7/2002 Rosen ............... H04B 7/18513
455/67.16
6,507,742 B1 1/2003 Lin et al.
(Continued)

FOREIGN PATENT DOCUMENTS

EP 3243292 11/2017
WO 2010/096031 A1 8/2010
(Continued)

OTHER PUBLICATIONS

Applying Graph Coloring in Resource Coordination for a High-Density Wireless Environment, (Research Paper), Mar. 2018, 10 Pgs.

(Continued)

*Primary Examiner* — Joseph Arevalo
(74) *Attorney, Agent, or Firm* — Sheppard Mullen Richter & Hampton LLP

(57) ABSTRACT

Systems and methods for assigning default an alternative BSS colors in a wireless local area network (WLAN) including a network graph representing radio neighbors include assigning a frequency range and EIRP for each radio represented in the network graph; generating a subgraph of radios operating at the same frequency range; for the subgraph, determining a minimum number of basic service set (BSS) colors required to BSS color the subgraph without BSS color conflict; based on the minimum number of BSS colors, assigning a default BSS color to each radio in the subgraph to avoid BSS color conflict among radios in the subgraph; based on remaining BSS colors, assigning one or more alternative BSS colors to each radio in the subgraph.

16 Claims, 10 Drawing Sheets

(51) Int. Cl.
*H04W 16/20* (2009.01)
*H04L 12/24* (2006.01)
*H04W 8/00* (2009.01)
*H04W 84/12* (2009.01)

(58) Field of Classification Search
CPC ..... H04W 16/14; H04W 28/20; H04W 28/22; H04W 36/0066; H04W 4/00; H04W 4/021; H04W 4/33; H04W 64/00; H04W 72/0426; H04W 72/087; H04W 72/12; H04W 76/00; H04W 76/10; H04W 76/15; H04W 80/12; H04W 84/04; H04W 84/042; H04W 88/08; H04W 88/10; H04W 88/12; H04W 8/06; H04W 8/26; H04W 92/22; H04W 52/0274; H04W 36/0085; H04W 36/08; H04W 36/24; H04W 16/18; H04W 24/02; H04W 24/10; H04W 36/00; H04W 52/50; H04W 72/00
USPC ... 455/450, 515, 456.1, 436, 439, 69, 456.2, 455/414.2, 437
See application file for complete search history.

(56) References Cited

U.S. PATENT DOCUMENTS

| | | | |
|---|---|---|---|
| 7,773,558 B2 | 8/2010 | Cho et al. | |
| 8,064,413 B2 | 11/2011 | Savoor | |
| 8,140,085 B2 | 3/2012 | Chaudhri | |
| 8,503,419 B2 | 8/2013 | Savoor | |
| 2006/0121903 A1* | 6/2006 | Lee | H04W 36/0061 455/439 |
| 2006/0227751 A1 | 10/2006 | Theobold et al. | |
| 2006/0229075 A1* | 10/2006 | Kim | H04W 36/005 455/436 |
| 2007/0263587 A1 | 11/2007 | Savoor | |
| 2009/0257380 A1 | 10/2009 | Meier | |
| 2011/0306364 A1* | 12/2011 | Gossain | H04L 12/5692 455/456.6 |
| 2013/0176932 A1 | 7/2013 | Shousterman et al. | |
| 2014/0075025 A1* | 3/2014 | Stanforth | H04W 48/14 709/225 |
| 2017/0048715 A1 | 2/2017 | Fan et al. | |
| 2017/0118725 A1 | 4/2017 | Chu | |

FOREIGN PATENT DOCUMENTS

| | | |
|---|---|---|
| WO | WO-2016191087 | 12/2016 |
| WO | WO-2018080603 | 5/2018 |

OTHER PUBLICATIONS

Extended European Search Report received for EP Patent Application No. 19185790.3, dated Dec. 17, 2019, 9 pages.

* cited by examiner

US 10,674,513 B2

BSS COLOR ASSIGNMENT IN A WIRELESS LOCAL AREA NETWORK

CROSS-REFERENCE TO RELATED APPLICATIONS

This application is a continuation of U.S. patent application Ser. No. 16/103,915, filed on Aug. 14, 2018, the entire contents of which is incorporated by reference herein. The Applicant hereby rescinds any disclaimer of claim scope in the parent application or the prosecution history thereof and advises the USPTO that the claims in this application may be broader than any claim in the parent application(s).

DESCRIPTION OF RELATED ART

The explosion and proliferation of wireless electronic devices has led to an increasing number of challenges in trying to accommodate the increasing number of users on wireless communication channels. For example, high levels of interference brought about by large numbers of users threatens to degrade the levels of network performance that users have come to expect. The IEEE 802.11 networks have continued to evolve in an attempt to address these challenges. These challenges have been addressed to some extent by introducing Dynamic Sensitivity Control (DSC) and Basic Service Sets (BSS) Color schemes in IEEE 802.11ax and IEEE 802.11ah implementations, respectively. These schemes are intended to improve network throughput and spectrum efficiency in dense environments.

Particularly, BSS Coloring was introduced in 802.11ah to increase the network capacity in dense environments by improving the ability to reuse frequencies. BSS color may be used to differentiate between intra-BSS frames and Overlapping BSS (OBSS) frames, and to determine which Clear Channel Assessment (CCA) threshold to use while accessing the shared channel resource in the same frequency range.

A radio can detect that its BSS color collides with the BSS color used by its neighboring radios from a BSS color collision report from its associated stations (STAB) or by receiving frames from an OBSS STA containing the same BSS color. If the collision persists too long (for example, the specified dot11BSSColorCollisionAPPeriod minimum value is 50 seconds), it stops using that BSS color or it switches to a different BSS color as specified by IEEE 802.11ax D2.2.

When a radio observes a BSS color conflict over a certain duration it may switch to a different BSS color that does not conflict with BSS color used by its neighboring radios. However, the standard does not currently specify any techniques for selecting a new BSS color when a switchover is needed.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Implementations of the disclosed technology may include systems and methods to determine channel assignments of radios on a network centrally and globally by a central entity such as wireless mobility controller, for example. When the channel plan is computed, BSS colors may also be assigned to the radios. In some applications different BSS colors are assigned to be used by different radios operating on the same frequency and in the same vicinity (co-channel neighbors).

The central entity computes a BSS color plan and assigns the color plan to the radios at the network level. Each radio may be assigned a set of BSS colors that include a default BSS color and one or more alternative BSS colors. Accordingly, the alternative or fallback BSS colors can be computed in advance of the need to switch colors. To prepare the color assignments, the system may use radio measurements to construct undirected network graphs. These measurements may include determining the channel and Equivalent Isotropically Radiated Power (EIRP) to determine groups of radios that may interfere with each other during network operations. After determining the channel and EIRP of the radios on the graph, subgraphs are constructed from the overall network graph based on the determined groups. For example, in one embodiment subgraphs may constructed by including in each subgraph only those radios that are each assigned to the same channel. The overall color plan can then be computed for each subgraph based on predicted interference.

The BSS color assignments can be computed as follows. First, the number of BSS colors needed to color the subgraph ($N_m$) is computed. This can be computed based on the maximum vertex degree. Based on this number, the number of alternative channel plans is computed (N−1). The primary, or default, BSS color plan is computed using $N_m$ number of BSS colors. (N−1) alternative, or fallback, BSS color plans may be generated based on the default BSS color plan. When BSS color plan computation is complete, the computed default BSS color and a set of one or more alternative BSS colors are provided to each radio. Each radio initializes its operations using the default BSS color for communication. When a radio detects a BSS color collision, it chooses a BSS color from the alternative BSS colors. In this way, the fallback BSS color can be selected locally by the radio experiencing the collision. Because the alternative BSS colors are determined in advance based on the subgraphs, there may be less chance for a BSS collision.

Figure 1:
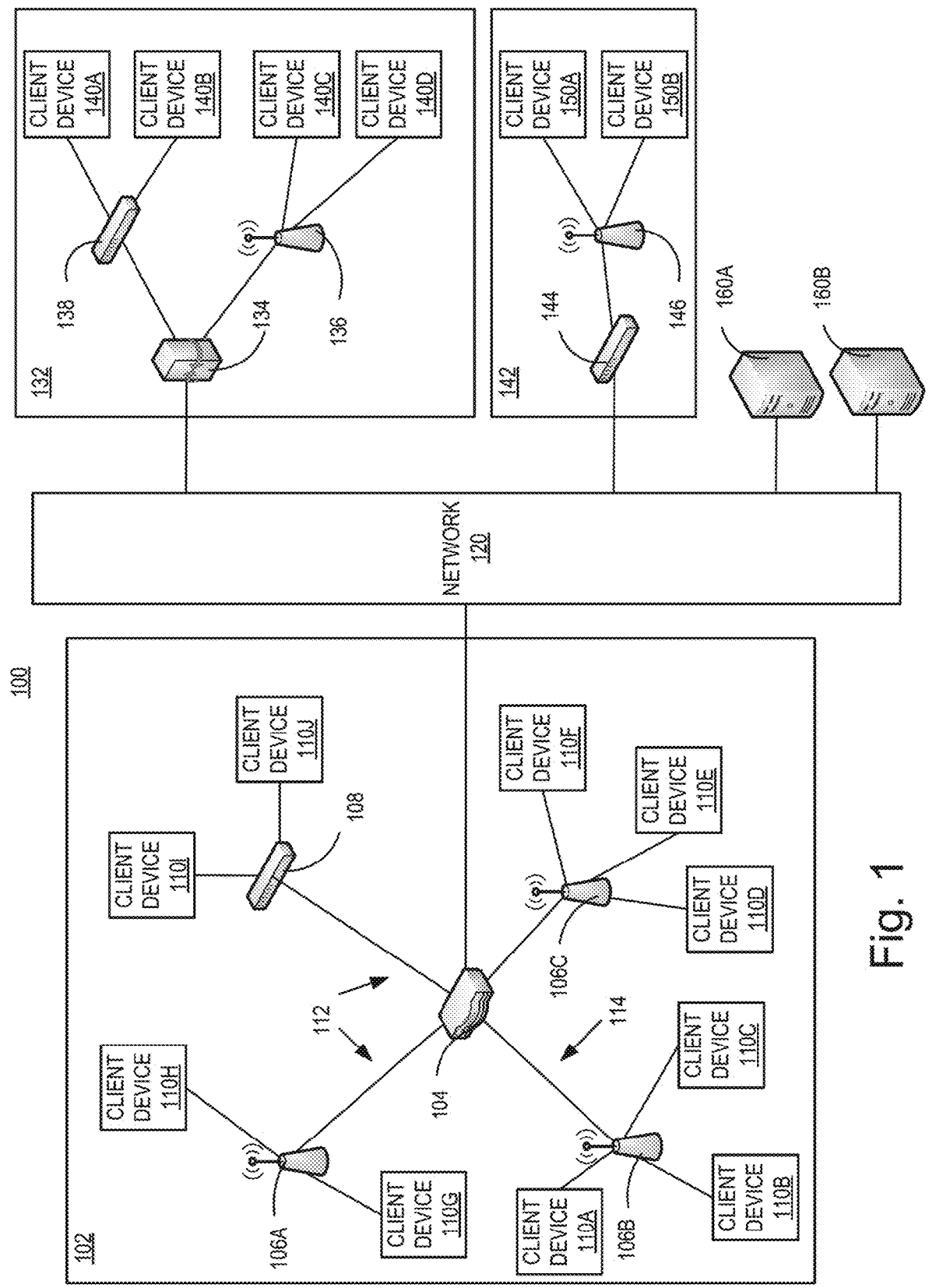
FIG. 1 illustrates one example of a network configuration 100 that may be implemented for an organization, such as a business, educational institution, governmental entity, healthcare facility or other organization.

Before describing embodiments of the disclosed systems and methods in detail, it is useful to describe an example network installation with which these systems and methods might be implemented in various applications. FIG. 1 illustrates one example of a network configuration 100 that may be implemented for an organization, such as a business, educational institution, governmental entity, healthcare facility or other organization. This diagram illustrates an example of a configuration implemented with an organization having multiple users (or at least multiple client devices 110) and possibly multiple physical or geographical sites 102, 132, 142. The network configuration 100 may include a primary site 102 in communication with a network 120. The network configuration 100 may also include one or more remote sites 132, 142, that are in communication with the network 120.

The primary site 102 may include a primary network, which can be, for example, an office network, home network or other network installation. The primary site 102 network may be a private network, such as a network that may include security and access controls to restrict access to authorized users of the private network. Authorized users may include, for example, employees of a company at primary site 102, residents of a house, customers at a business, and so on.

In the illustrated example, the primary site 102 includes a controller 104 in communication with the network 120. The controller 104 may provide communication with the network 120 for the primary site 102, though it may not be the only point of communication with the network 120 for the primary site 102. A single controller 104 is illustrated, though the primary site may include multiple controllers and/or multiple communication points with network 120. In some embodiments, the controller 104 communicates with the network 120 through a router (not illustrated). In other embodiments, the controller 104 provides router functionality to the devices in the primary site 102.

A controller 104 may be operable to configure and manage network devices, such as at the primary site 102, and may also manage network devices at the remote sites 132, 134. The controller 104 may be operable to configure and/or manage switches, routers, access points, and/or client devices connected to a network. The controller 104 may itself be, or provide the functionality of, an access point.

The controller 104 may be in communication with one or more switches 108 and/or wireless Access Points (Aps) 106a-c. Switches 108 and wireless APs 106a-c provide network connectivity to various client devices 110a-j. Using a connection to a switch 108 or AP 106a-c, a client device 110a-j may access network resources, including other devices on the (primary site 102) network and the network 120.

Examples of client devices may include: desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, personal digital assistants (PDAs), mobile phones, smart phones, smart terminals, dumb terminals, virtual terminals, video game consoles, virtual assistants, Internet of Things (IOT) devices, and the like.

Within the primary site 102, a switch 108 is included as one example of a point of access to the network established in primary site 102 for wired client devices 110i-j. Client devices 110i-j may connect to the switch 108 and through the switch 108, may be able to access other devices within the network configuration 100. The client devices 110i-j may also be able to access the network 120, through the switch 108. The client devices 110i-j may communicate with the switch 108 over a wired 112 connection. In the illustrated example, the switch 108 communicates with the controller 104 over a wired 112 connection, though this connection may also be wireless.

Wireless APs 106a-c are included as another example of a point of access to the network established in primary site 102 for client devices 110a-h. Each of APs 106a-c may be a combination of hardware, software, and/or firmware that is configured to provide wireless network connectivity to wireless client devices 110a-h. In the illustrated example, APs 106a-c can be managed and configured by the controller 104. APs 106a-c communicate with the controller 104 and the network over connections 112, which may be either wired or wireless interfaces.

The network configuration 100 may include one or more remote sites 132. A remote site 132 may be located in a different physical or geographical location from the primary site 102. In some cases, the remote site 132 may be in the same geographical location, or possibly the same building, as the primary site 102, but lacks a direct connection to the network located within the primary site 102. Instead, remote site 132 may utilize a connection over a different network, e.g., network 120. A remote site 132 such as the one illustrated in FIG. 1 may be, for example, a satellite office, another floor or suite in a building, and so on. The remote site 132 may include a gateway device 134 for communicating with the network 120. A gateway device 134 may be a router, a digital-to-analog modem, a cable modem, a Digital Subscriber Line (DSL) modem, or some other network device configured to communicate to the network 120. The remote site 132 may also include a switch 138 and/or AP 136 in communication with the gateway device 134 over either wired or wireless connections. The switch 138 and AP 136 provide connectivity to the network for various client devices 140a-d.

In various embodiments, the remote site 132 may be in direct communication with primary site 102, such that client devices 140a-d at the remote site 132 access the network resources at the primary site 102 as if these clients devices 140a-d were located at the primary site 102. In such embodiments, the remote site 132 is managed by the controller 104 at the primary site 102, and the controller 104 provides the necessary connectivity, security, and accessibility that enable the remote site 132's communication with the primary site 102. Once connected to the primary site 102, the remote site 132 may function as a part of a private network provided by the primary site 102.

In various embodiments, the network configuration 100 may include one or more smaller remote sites 142, comprising only a gateway device 144 for communicating with the network 120 and a wireless AP 146, by which various client devices 150a-b access the network 120. Such a remote site 142 may represent, for example, an individual employee's home or a temporary remote office. The remote site 142 may also be in communication with the primary site 102, such that the client devices 150*a-b* at remote site 142 access network resources at the primary site 102 as if these client devices 150*a-b* were located at the primary site 102. The remote site 142 may be managed by the controller 104 at the primary site 102 to make this transparency possible. Once connected to the primary site 102, the remote site 142 may function as a part of a private network provided by the primary site 102.

The network 120 may be a public or private network, such as the Internet, or other communication network to allow connectivity among the various sites 102, 130 to 142 as well as access to servers 160*a-b*. The network 120 may include third-party telecommunication lines, such as phone lines, broadcast coaxial cable, fiber optic cables, satellite communications, cellular communications, and the like. The network 120 may include any number of intermediate network devices, such as switches, routers, gateways, servers, and/or controllers, which are not directly part of the network configuration 100 but that facilitate communication between the various parts of the network configuration 100, and between the network configuration 100 and other network-connected entities. The network 120 may include various content servers 160*a-b*. Content servers 160*a-b* may include various providers of multimedia downloadable and/or streaming content, including audio, video, graphical, and/or text content, or any combination thereof. Examples of content servers 160*a-b* include, for example, web servers, streaming radio and video providers, and cable and satellite television providers. The client devices 110*a j*, 140*a-d*, 150*a-b* may request and access the multimedia content provided by the content servers 160*a-b*.

Although only 10 client devices 110*a-j*, or stations (STAs), are illustrated at primary site 102 in the example of FIG. 1, in various applications, a network may include dramatically larger quantities of STAs. For example, various wireless networks may include hundreds, thousands, or even tens of thousands of STAs communicating with their respective APs, potentially at the same time. As noted above, various IEEE 802.11 networks may implement what is referred to as BSS coloring to increase network capacity in such dense environments. This can allow improvement and frequency reuse among network devices. As also noted above, networks implementing BSS coloring may further allow a fall back to an alternative color where the primary or default color assignment results in a BSS color conflict. Because it may be time-consuming to identify an appropriate alternative color when a BSS color conflict occurs, conventional fallback approaches may introduce undesired amounts of latency or delay in the process. Accordingly, various embodiments of the systems and methods disclosed herein may provide predetermination of alternative color plans so that a fallback color determination is already made in advance, before the BSS color conflict occurs. In some applications, the BSS color computation and assignment may be made on a global basis for the STAs in the network.

Figure 2:
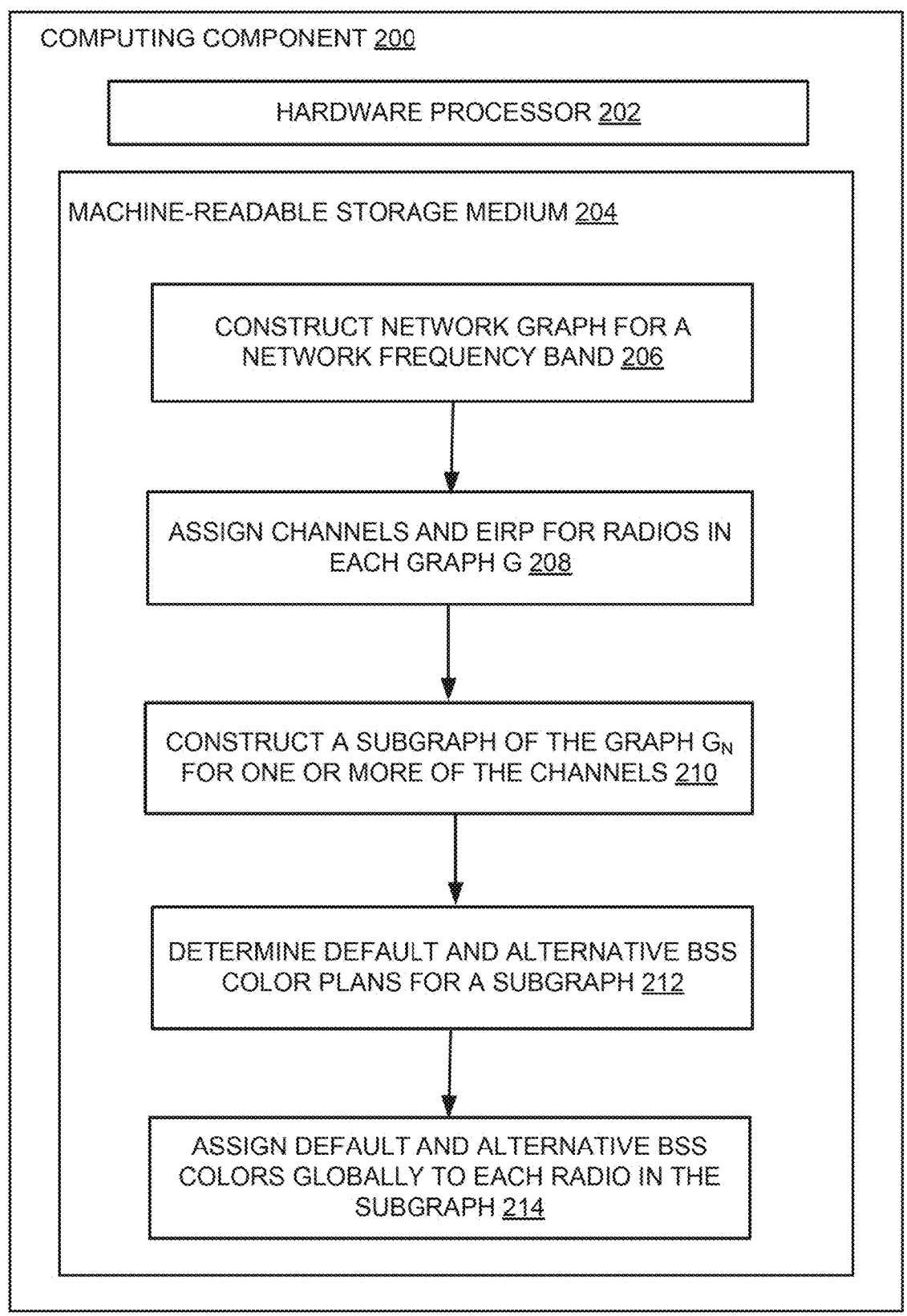
FIG. 2 is a block diagram of an example computing component or device for global BSS color computation and assignment in accordance with one embodiment.

FIG. 2 is a block diagram of an example computing component or device 200 for global BSS color computation and assignment in accordance with one embodiment. Computing component 200 may be, for example, a server computer, a controller, or any other similar computing component capable of processing data. In the example implementation of FIG. 2, the computing component 200 includes a hardware processor, 202, and machine-readable storage medium, 204. In some embodiments, computing component 200 may be an embodiment of an AP or AP controller, e.g., AP 106*b* or AP controller 104, respectively, or a component of network 120 of FIG. 1, for example. More particularly, computing component 200 may be a component of a central entity such as wireless mobility controller in the network.

Hardware processor 202 may be one or more central processing units (CPUs), semiconductor-based microprocessors, and/or other hardware devices suitable for retrieval and execution of instructions stored in machine-readable storage medium, 204. Hardware processor 202 may fetch, decode, and execute instructions, such as instructions 206-214, to control processes or operations for BSS color computation and assignment. As an alternative or in addition to retrieving and executing instructions, hardware processor 202 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 304, may be any electronic, magnetic, optical, or other physical storage device that contains or stores executable instructions. Thus, machine-readable storage medium 204 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 202 may be a non-transitory storage medium, where the term "non-transitory" does not encompass transitory propagating signals. As described in detail below, machine-readable storage medium 202 may be encoded with executable instructions, for example, instructions 206-212, for client device grouping.

Hardware processor 200 may execute instruction 206 to construct a network graph, G, for a network such as, for example, the network at primary site 102. The network graph, G, may be based on, for example, the radio neighbor discovered for each radio in the network. The network graph may include a vertex for each radio and edges between the vertices indicating that vertices connected by edges are operating on the same channel number (frequency range).

Hardware processor 200 may execute instruction 208 to assign a channel (frequency range) and EIRP for the radios in each graph. Channel identifier c may be mapped to a frequency range (e.g. channel 36 for frequency range 5.17GHz–5.19 GHz, channel 36E for frequency range 5.17GHz–5.25GHz, and so on). C may be used to represent the set of valid channels that can be used at the network (graph G). For example, C={36, 40, 165}.

Figure 3:
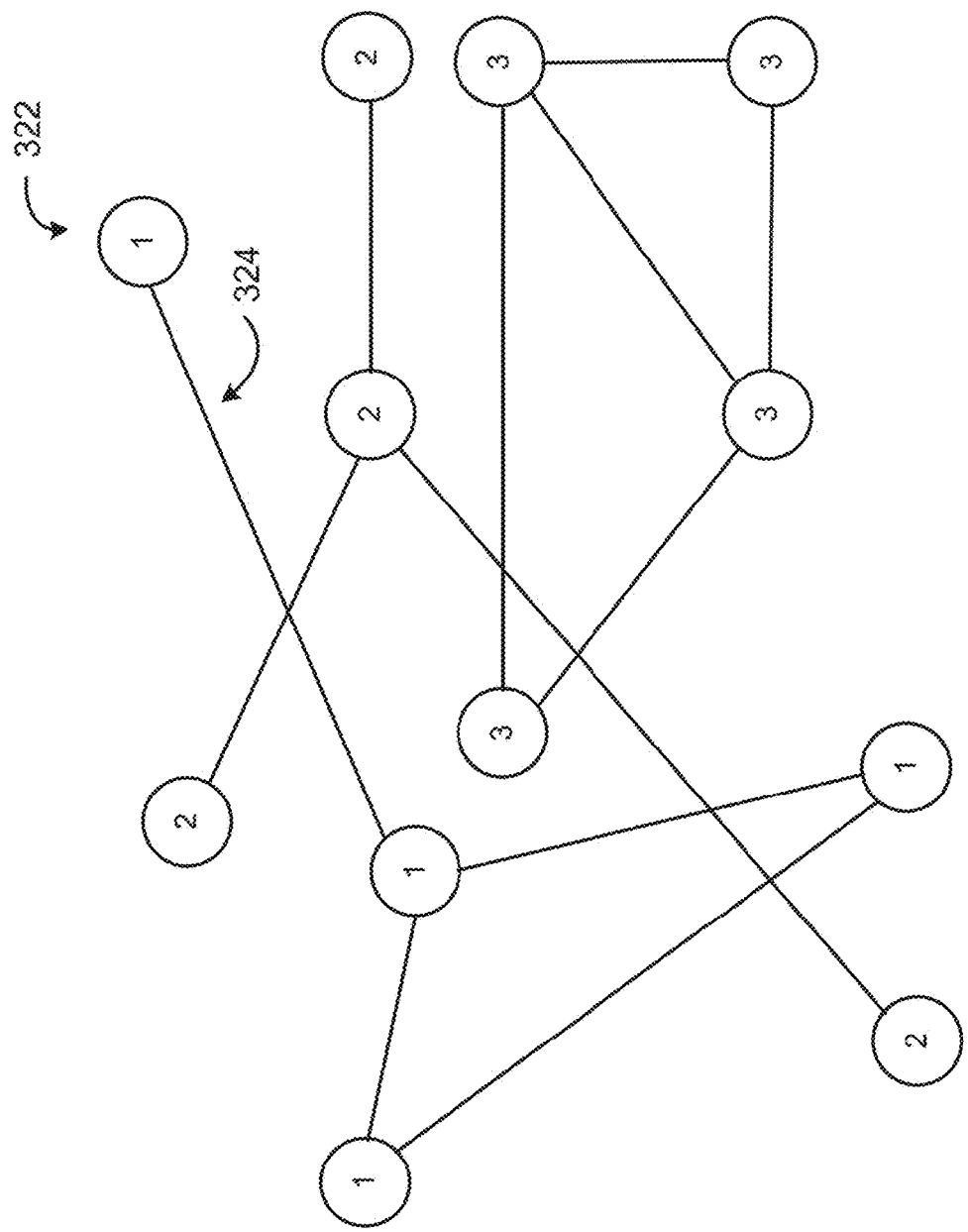
FIG. 3 is a diagram illustrating a simplified example of a network graph for relatively small network having 12 radios communicating on 3 different channels in accordance with one embodiment.

FIG. 3 is a diagram illustrating a simplified example of a network graph for relatively small network having 12 radios communicating on 3 different channels. In this example, each vertex 322 represents a radio in the network, and is labeled with a number 1, 2, 3 indicating the channel used by the radio for that vertex 322. Each edge 324 represents a radio-neighbor pair, identifying the other radios in the network with which a given radio may communicate. During the discovery process, and adds is added between a pair of radios (vertices 322) if either radio discovers the other radio. In some embodiments, an edge weight may be added. For example, the edge weight may be a function of path loss. In various applications, a separate network graph can be constructed for each different frequency band used by the communication network (e.g., 2.4 GHz band and 5 GHz band).

An edge 324 between a pair of radios (vertices) 322 can be filtered from the graph either during subgraph creation, or after the subgraph is created. For example, an edge 324 may be filtered from the subgraph if the distance between the radio pair is large enough such that the interference is not very high. For example, a neighbor B of a radio R may be excluded if EIRP(R)—Pathloss (R, B) is less than a certain threshold (e.g. −82 dBm), where EIRP(R) is the EIRP of radio R and Pathloss (R, B) is the pathloss between radios R and B. In other words, if the anticipated interference between the two radios is below a determined acceptable threshold, possible interference between those radios can be ignored for purposes of color assignment. In the example listed above, the anticipated signal strength of the signal at one radio, caused by the other radio is less than −82 dBm. In other embodiments, other thresholds can be used.

Hardware processor 200 may execute instruction 210 to construct one or more subgraphs of the network graph, G. For example, a set of subgraphs can be constructed for each channel number included in the network graph, G. In the simple example of FIG. 3, three possible subgraphs can be created, one for channel 1, one for channel 2, and one for channel 3. Although the example of FIG. 3 is for a relatively small network (10 STAs), embodiments may be implemented addressing much larger and more dense networks including those with hundreds, thousands, or tens of thousands of STAs, for example.

Figure 4:
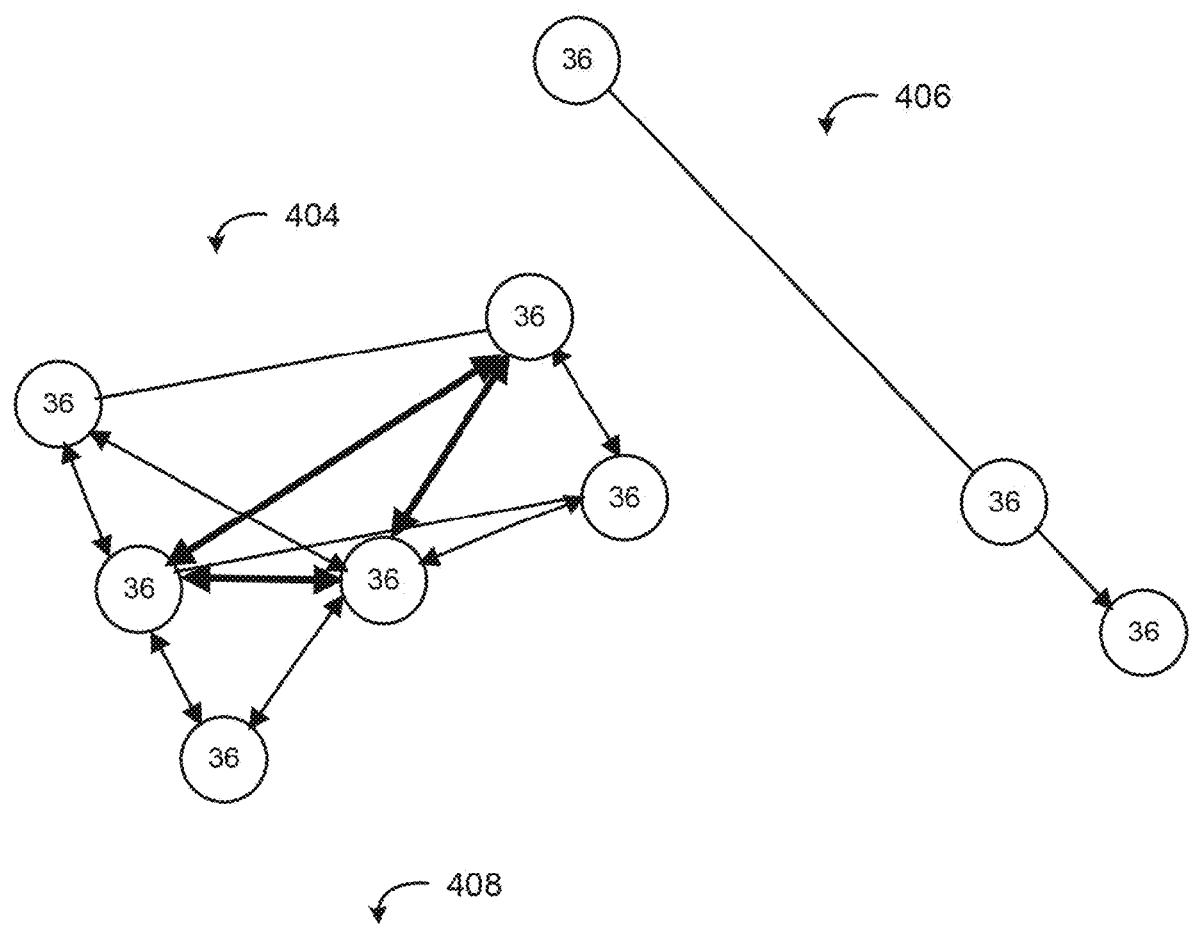
FIG. 4 illustrates an example subgraph constructed for radios operating on channel 36 in accordance with one embodiment.
Figure 4:
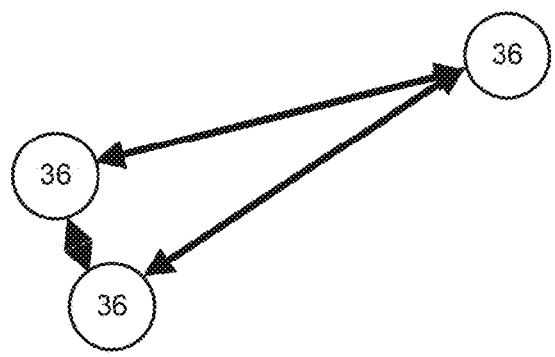

Because a subgraph focuses on a particular channel, it is possible that more than one subgraph for a given channel may result during subgraph generation, as the links between each pair of radios on different channels would be excluded from the subgraphs. FIG. 4 illustrates an example subgraph constructed for radios operating on channel 36. By filtering vertices and edges as described above, this example includes three disjointed subgraph sections, 404, 406, 408. These sections are disjointed because none of the radios in a given section is a co-channel neighbor of any of the radios in any other section.

In constructing the subgraphs, An identifier, n, may be assigned to each subgraph. Vertices in the $n^{th}$ subgraph $G_n$ are the radios from the network graph, G, on the same assigned channel. Edges in the subgraph $G_n$ represent the discovered links between the radios on the same channel (i.e., between co-channel radio neighbors).

Depending on the network, each radio may use a different channel bandwidth. For example, with 802.11, some radios may be on the 80 MHz channel bandwidth and other radios may be on the 20 MHz channel bandwidth. In such applications radios on the 20 MHz channel bandwidth may see the radios on the 80 MHz channel bandwidth, and vice versa. This may be taken into account when constructing subgraphs. In some applications, the channel indication in the network graph, G, can be represented by 2 sets of characters such as, for example, a channel number and a postfix. For example, the channel number may indicate the primary channel (e.g. 20 MHz, 80 MHz, and so on) and the postfix may indicate the channel bandwidth. For example, 36 he indicates that the primary channel is 36 and the channel bandwidth is 80 MHz. As another example, 36+ may indicate that the primary 20 MHz channel is 36 and the channel bandwidth is 40 MHz. As yet another example, 40 minus indicate that the primary 20 MHz channel is 40 and the channel bandwidth is 40 MHz. 36 may indicate that the primary 20 MHz channel is 36 and the channel bandwidth is 20 MHz.

As noted, this additional information can be used to construct the subgraphs. In one embodiment, the process starts with the channel (frequency range) with the widest channel bandwidth. For example, in 802.11ah, a channel with an 80 MHz channel bandwidth on the 5 GHz band spans over two 40 MHz channels, and four 20 MHz channels. As a further example, the process may start with the frequency range in 5.170MHz–5.250 MHz. The possible channels on this range include 36E, 40E, 44E, 48E, 36+, 40−, 44+, 48−, 36, 40, 44, and 48. The process may then create subgraphs to include the radios on this set of channels.

The edges of the subgraphs may be filtered out to remove those that don't overlap. For example, if the frequency range of radio X and range of radio Y do not overlap each other (e.g. 36+ and 44+, 36 and 40, 36 and 48−), the edge between radio X and radio Y may be removed or excluded from the graph.

Figure 5:
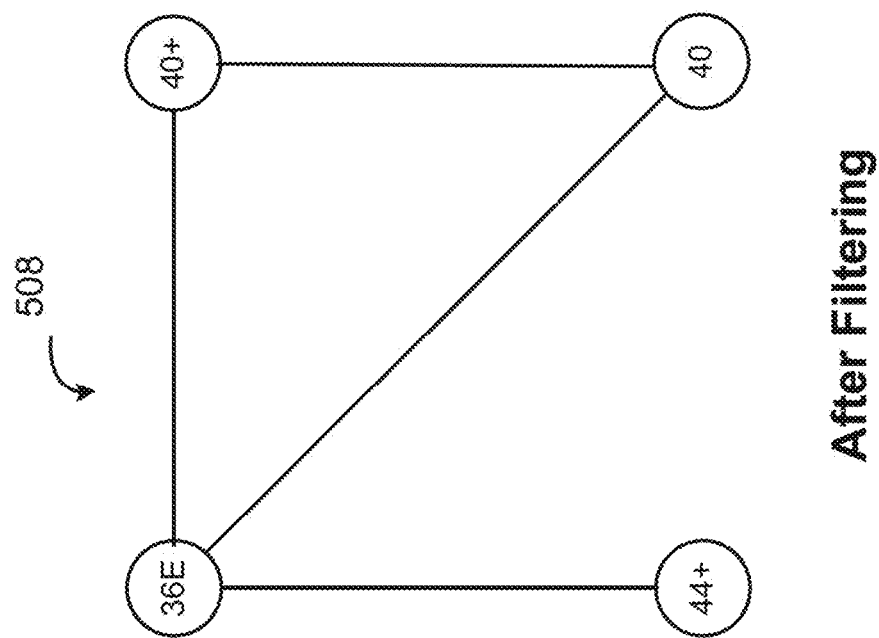
FIG. 5 illustrates an example of subgraph filtering in accordance with one embodiment.
Figure 5:
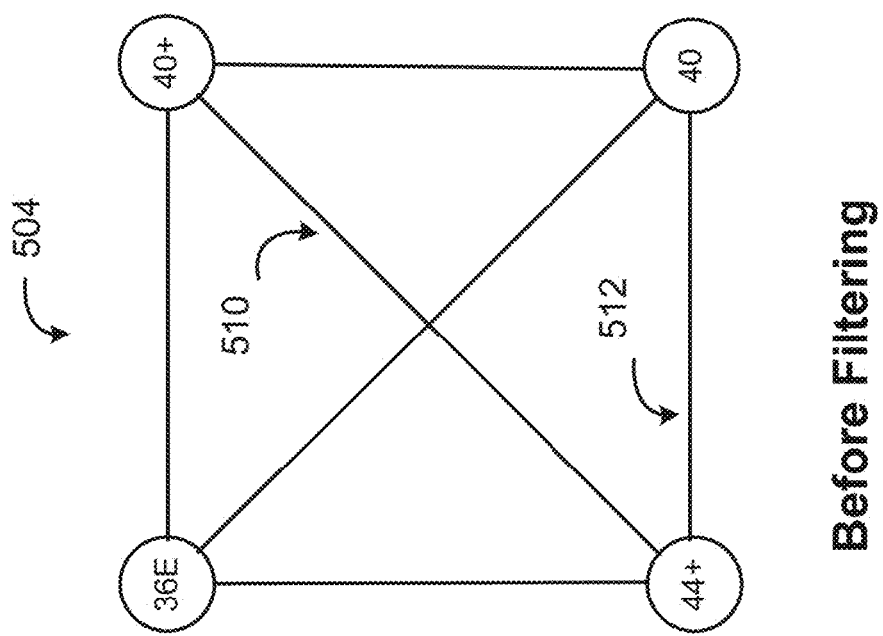

A more straightforward example of filtering is provided in FIG. 5. The differences are illustrated in the example graph before filtering 504 and the example graph after filtering 508. In this example, the edge between {44+, 40−} 510 and the edge between {44+, 40} 512 are filtered (removed) because the frequency ranges do not overlap each other.

Alternatively, the edges can be removed from the whole graph including all radios using the same criteria (If the frequency range of radio X and range of radio Y do not overlap each other, remove the edge between radio X and radio Y.)

Hardware processor 200 may execute instruction 212 to determine default an alternative BSS color plans for the created subgraphs. In implementations where there are a sufficient number of BSS colors available for assignment, multiple BSS color plans (i.e., a default BSS color plan and one or more alternative BSS color plans) may be determined and assigned.

In various embodiments, multiple BSS color plans may be constructed using disjoint sets of BSS colors (e.g. $S_0$={1, 2, ... 16}, $S_1$={17, 18, ... 32}) to avoid overlap. In this operation of the process, the number of global BSS color plans (e.g., the number of feasible disjoint sets of BSS colors) is determined. In one embodiment, the process for determining the number of feasible global BSS color plans uses the known bound of chromatic number, which indicates the smallest quantity of colors needed to color a graph without overlap. The chromatic number is less than or equal to the maximum vertex degree plus one more color. The vertex degree indicates the number of edges connected to a vertex, and the maximum vertex degree is the vertex with the maximum number of edges. In other words, graph can be colored using one more color than the maximum vertex degree. Other techniques may also be used for determining the chromatic number.

Hardware processor 200 may execute instruction 214 to assign default and alternative BSS colors to each radio in the subgraph. These operations may be repeated for each subgraph so that each radio in the subgraph is assigned default and alternative (if sufficient colors are present) BSS colors.

As noted above, alternative BSS colors can be assigned where there are sufficient quantities of colors available for a subgraph. The number of BSS colors defined in IEEE 802.11ax is 63 and this may be sufficiently large in many deployments. In IEEE 802.11, there are 25 channels with a 20MHz bandwidth, 12 channels with a 40MHz bandwidth, and 6 channels with an 80MHz bandwidth available on the 5GHz frequency band. Because the BSS color collision is material only between radios operating on the same frequency range (channel), and typical deployments, the anticipated number of radio neighbors discovered from a radio is generally less than 100, 63 colors are expected to be sufficient to allow identification of a default BSS color set and at least one alternative BSS color set.

Figure 6:
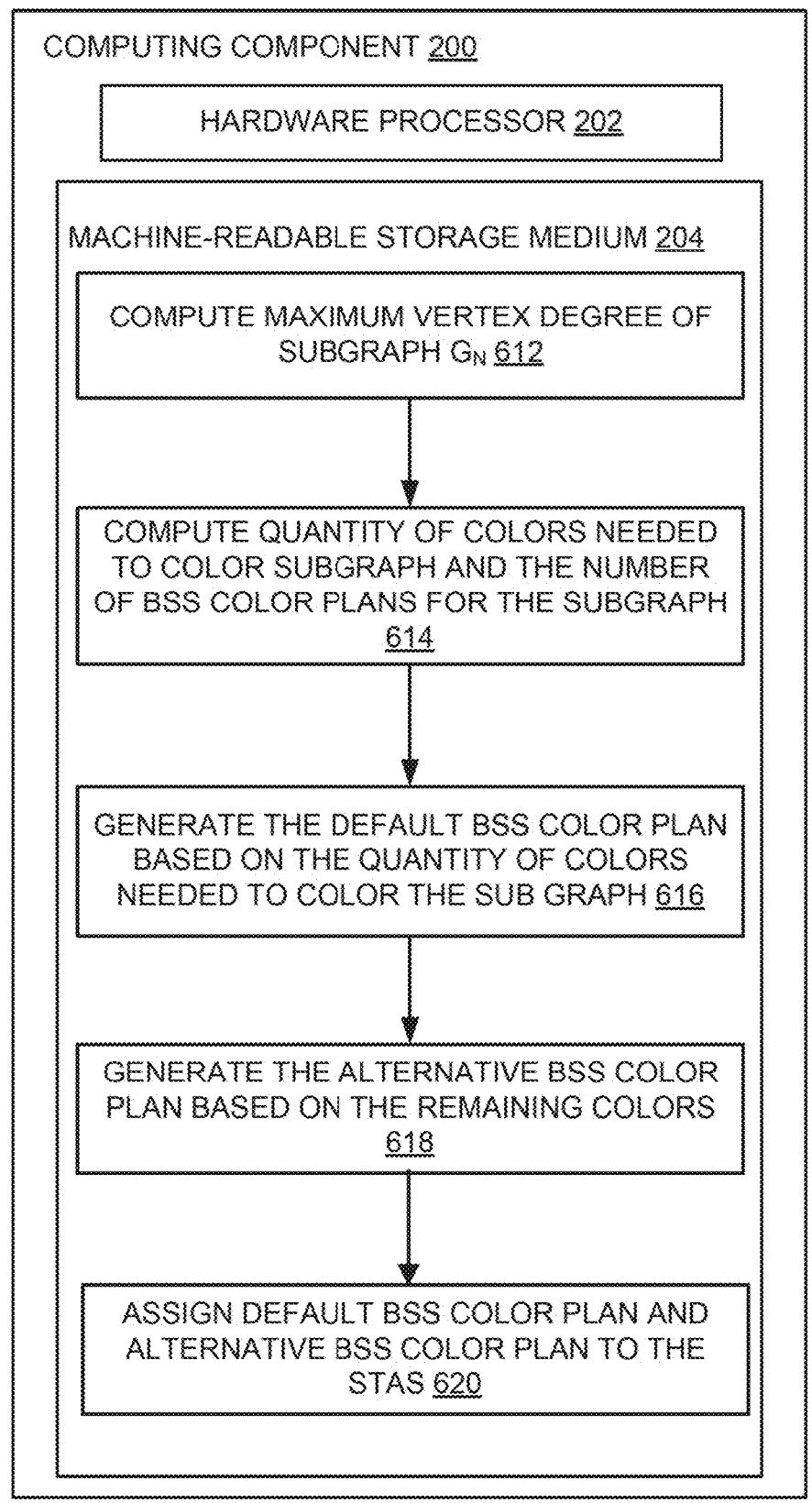
FIG. 6 is a block diagram of an example computing component for generating a default BSS color plan and one or more alternative BSS color plans in accordance with one embodiment.

FIG. 6 is a block diagram of an example computing component 200 for generating a default BSS color plan and one or more alternative BSS color plans in accordance with one embodiment. Computing component 200, hardware processor 202, and machine readable storage medium 204 may be the same as that illustrated in FIG. 2 or similar thereto. As illustrated in FIG. 6, hardware processor 200 may execute instruction 612 to compute a maximum vertex degree of a subgraph, $G_N$. As noted above, in the constructed radio graphs, the vertex degree is a number of radio neighbors that can be discovered from a given radio. The maximum vertex degree is the quantity of radio neighbors for the radio having the greatest quantity of radio neighbors discovered across all radios in the subgraph. The maximum vertex degree is denoted by $N_v$ in this disclosure.

Hardware processor 200 may execute instruction 614 to compute a quantity of colors needed to color the subgraph and the number of BSS color plans for the subgraph. The smallest number of colors needed to color a subgraph, $G_n$, is bounded by one plus maximum vertex degree, as also noted above. Thus, $N_m$, the number of colors needed to color subgraph, $G_n$, may be expressed as $$N_m = \begin{cases} N_v + 1, & N_v + 1 \leq N_c \\ N_c, & \text{otherwise} \end{cases}$$

where $N_c$ is the number of available BSS colors on subgraph $G_n$.

The number of global BSS color plans, N, for subgraph $G_n$ may be computed as the value of the number of available BSS colors on subgraph $G_n$, $N_c$, divided by the maximum vertex degree plus one color, $N_v+1$. This can also be computed as the value of the number of available BSS colors, $N_c$, divided by the number of colors needed to color subgraph, $N_m$. This is given by:

$$N = \left\lfloor \frac{N_c}{N_v + 1} \right\rfloor = \left\lfloor \frac{N_c}{N_m} \right\rfloor$$

Where, again, number of colors needed to color subgraph, $N_m$, is equal to the maximum vertex degree plus one color.

For example, if the number of available BSS colors is 63 (as defined in IEEE 802.11ax) and the maximum vertex degree in a subgraph (maximum number of co-channel radio neighbors discovered from each radio), $N_v$ is 9, the number of global BSS color plans for this subgraph on channel c is $$\left\lfloor \frac{63}{9+1} \right\rfloor = 6.$$

Hardware processor 200 may execute instruction 616 to generate the default BSS color plan based on the quantity of colors needed to color the subgraph. Using $N_m$ colors, the hardware processor may execute the instruction to color the subgraph, $G_n$, According to the determined colors. In one embodiment, a greedy color selection algorithm can be used. Greedy coloring can be implemented, for example, by examining each radio (represented by a vertex) in sequence. When a radio "i" is visited, the process selects a color that is not used by the neighboring radios of "i", assuming these neighboring radios are visited before radio "i" is visited. This process may continue until each radio is assigned a color that is not used by any of its neighboring radios.

In another example, a more optimized BSS color selection process may be used that reduces or minimizes the number of colors required for assignment as compared to the greedy BSS color selection algorithm. This can be used, for example, where color conflicts cannot be completely avoidable. This may arise, for example, in situations in which there is only a small quantity of available BSS colors while the quantity of vertex degrees in the subgraph is high. Using this process, the hardware processor may execute an instruction such that for each neighbor radio (for purposes of this example, identified by j), discovered by a radio (for purposes of this example, identified by i), the corresponding color conflict for edge from i to j, $r_{ij}$, is given by $$r_{ij} = r_{ji} = \begin{cases} 1, & \text{if } i \text{ and } j \text{ have the same color} \\ 0, & \text{otherwise} \end{cases}.$$

That is, were both radios have the same color there is a radio color conflict; otherwise there is no radio color conflict.

Where there is a radio color conflict identified for radio i, that radio color conflict, $R_i$, for that radio may be calculated as the sum of the neighboring sets of radios discovered by radio, i, for which there is a conflict (i.e., where $r_{ji}=1$). This may be expressed as $$R_i = \Sigma_{j \in NBR_i} r_{ij},$$

where $NBR_i$ is the set of neighbors discovered from radio i.

The BSS color set $\{1, \ldots, N_m\}$ may be used.

A network BSS color conflict, $A_1$, may be calculated as the sum of the set of vertices in the subgraph for radio i, which may be expressed as $$A_1 = \Sigma_{i \in v(G_n)} R_i$$

where $V(G_n)$ is the set of vertices in subgraph $G_n$.

Accordingly, the color cost $A_2$ is calculated as $$A_2 = \Sigma_{i \in v(G_n)} Color_i$$

where $Color_i \in \{1, \ldots, N_m\}$ is the BSS color assigned to radio i.

In this process, $A_1$ and $A_2$ are the costs functions to be minimized. Accordingly, the color plan may be chosen by selecting a BSS color plan that minimizes these two cost functions. In some embodiments, a multi-objective optimization can be used. If the network color conflict $A_1$ is not zero, then a BSS color conflict exists. In this case, the BSS color may be disabled for those radios with a BSS color conflict ($R_i > 0$).

As noted above, multiple algorithms can be selected for determining the BSS color plans. The algorithms described above include a greedy algorithm for BSS coloring and a more optimal algorithm for BSS coloring. In some embodiments, the number of colors needed to color subgraph, $N_m$, can be used to determine which algorithm may be more appropriate. For example, where $N_m \leq N_c$, it may be appropriate to use the greedy coloring algorithm whereas in other situations the optimal coloring algorithm may be preferred.

Figure 7:
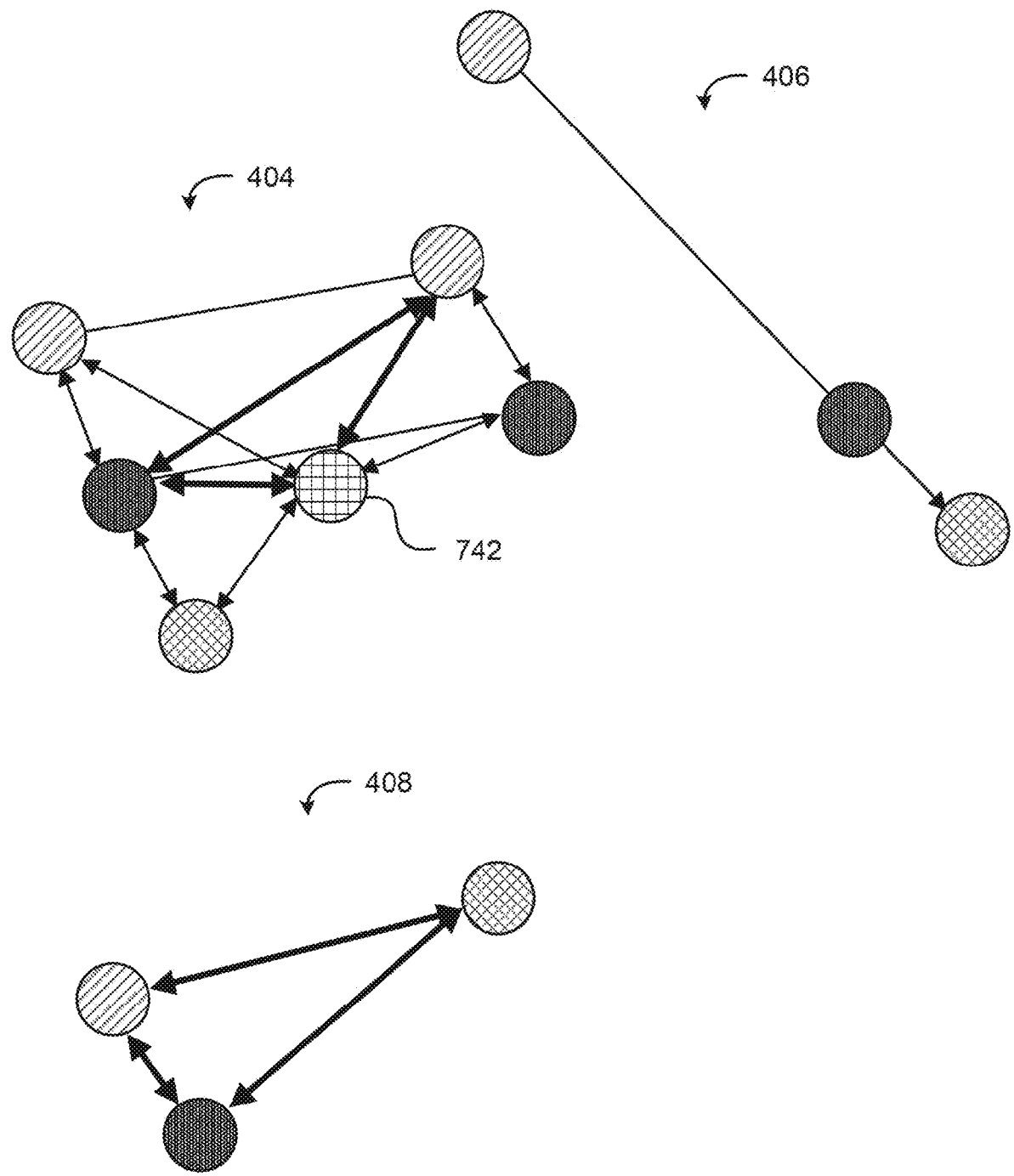
FIG. 7 illustrates an example of the subgraphs illustrated in FIG. 4, with an applied default BSS color assignment in accordance with one embodiment.

FIG. 7 illustrates an example of the subgraphs illustrated in FIG. 4, with an applied default BSS color assignment. Each vertex represents a radio in the identified group of radios, and each edge represents a radio-neighbor pair. The shading for each vertex indicates a default BSS color assigned to the radio represented by that vertex. Like shading indicates a like BSS color assignment. In this example, the vertex with the maximum number of edges is vertex 742 in subgraph section 404. Vertex 742 is connected to five other vertices by edges. Accordingly, in this example subgraph, the maximum vertex degree, $N_v$, is 5. As described above, and the number of number of BSS colors needed to color this subgraph is the maximum vertex degree plus one color, $N_v+1$. Accordingly, the number of BSS colors required, $N_m$, is 6. Accordingly, there are $\lfloor 63/6 \rfloor = 10$ BSS color plans that can be generated (one default BSS color and nine alternative BSS colors) for this subgraph.

Hardware processor 200 may execute instruction 618 to generate an alternative BSS color plan using remaining colors. If the number of color plans available to color the subgraph, N, computed by the processor at operation 614 is greater than one, alternative BSS color plans can be generated. Otherwise, only a default BSS color plan is provided to the radios in the subgraph. Accordingly, any remaining BSS color plans after the default BSS color plan is selected (e.g., N-1 BSS color plans) may be generated. For example, assume that the default BSS color plan is composed of the BSS colors in the set $S_0=\{1, 2, \ldots, N_m\}$, the alternative BSS color plan can be generated as follows. In an alternative BSS color plan, $k \in \{1, \ldots, N-1\}$, the set of BSS colors used, $S_k$, is as follows:

$$S_k + \{1+N_m \cdot k, 2+N_m \cdot k, \ldots, (k+1) \cdot N_m\}$$

For example, consider a case in which the available BSS color set is $\{1, 2, 3, \ldots, 9\}$ and there are three co-channel neighbors. $S_0=\{1, 2, 3\}$, $S_1=\{4, 5, 6\}$, $S_2=\{7, 8, 9\}$. $S_0$ can be the selected as the default BSS color set (e.g., k=0) while the other BSS color sets for each of k=1, ..., N-1, are identified as the alternative BSS color sets for the subgraph. However, $S_0$ need not necessarily be the default BSS color set. In operation 616 and 618, among $\{S_0, \ldots, S_{N-1}\}$, one BSS color set can be identified as the default BSS color plan while the remaining BSS color sets may be identified as the alternative BSS color plans. For example, $S_2$ can be the default color set, while $S_0$ and $S_1$ can be the alternative color sets. Other permutations can also be used.

Hardware processor 200 may execute instruction 620 to assign the default BSS color plan and one or more alternative BSS color plans to the STAs. Once the default BSS color plan and one or more alternative BSS color plans are determined, the colors to be assigned to each radio can be computed. In one embodiment, alternative BSS colors are chosen as the default color plus the number of colors needed to color the subgraph in which the radio resides. For example, where the default BSS color plan is from $S_0$ and the default BSS color is L, alternative BSS colors are $\{L+N_m, L+N_m \cdot 2, \ldots, L+N_m \cdot (N-1)\}$. In this case, the BSS color L in the default BSS color plan is mapped to $L+N_m$ in the first alternative BSS color plan, $L+N_m \cdot 2$ in the second alternative BSS color plan, and so on for example, if $N_m$ is 10, and $N_c$ is 63, six BSS color plans are computed. Accordingly, there are as many as five alternative BSS color plans that may be provided to this radio. If a radio is assigned BSS color 5 in the default BSS color plan, the alternative BSS colors assigned to this radios are selected from the colors 15, 25, 35, 45, and 55.

In another embodiment, where the BSS color sets are $S_0=\{1, 2, 3\}$, $S_1=\{4, 5, 6\}$, and $S_2=\{7, 8, 9\}$, each set can be converted into a list with a different iteration of the elements in the corresponding set. $L_0=[1, 2, 3]$, $L_2=[5, 6, 4]$, and $L_3=[9, 7, 8]$. The alternative BSS colors assigned to a radio is the one in the list with the same index as the default BSS color. For example, if the radio is assigned the default BSS Color 2 from $S_0$ ($S_0$ is the default BSS color set), an index of BSS color 2 in $L_0$ is 2. Index(BSS_COLOR) returns an index of the BSS color in the default BSS color list. Alternative BSS colors for this radio maybe defined as $L_2[1]$ and $L_3[1]$ which are $L_2[\text{Index}(2)]$ and $L_3[\text{Index}(3)]$.

Where a radio in the subgraph receives the default BSS color as well as alternative BSS colors, it uses the default BSS color as its initial operating condition, and falls back to the alternative BSS colors where there is a color conflict. Accordingly, when a color conflict arises, and there are alternative BSS color plans defined for the radio, the radio can default to an alternative BSS color to alleviate the conflict, without having to compute an alternative BSS color at that time. In various embodiments, the system can recompute BSS color plans, both default and alternative, and distribute these to the radios in the network. The frequency with which BSS color plans are recomputed may depend on the rate at which the network is changing. For example, where new STAs are frequently added or removed from the network, more frequent BSS color plan computations may be desired. Likewise, where STAs are mobile and changing location throughout the network, re-computation may be desired to ensure that changes in the network don't result in an inordinate quantity of conflicts.

Figure 8:
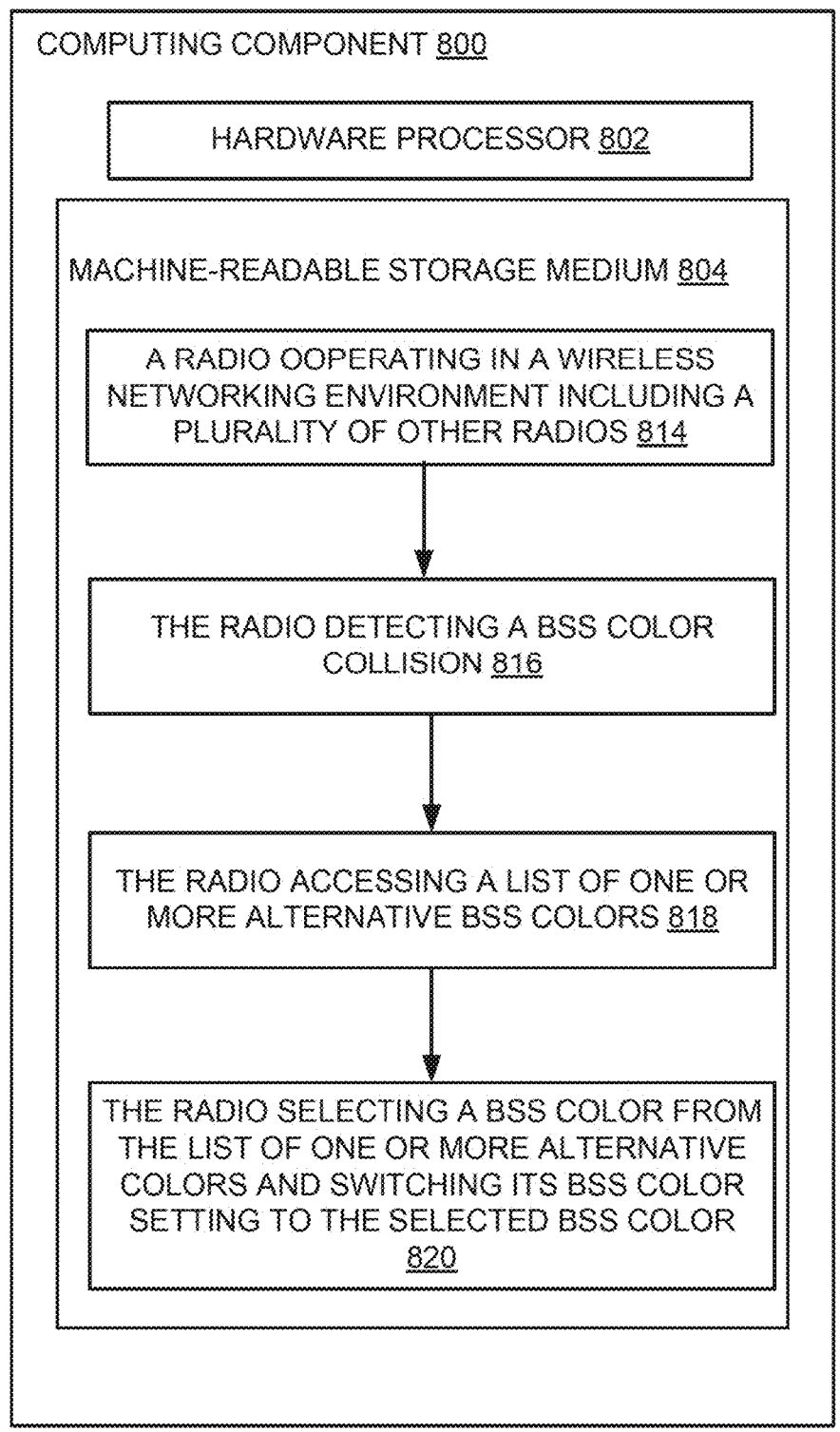
FIG. 8 is a block diagram of an example computing component for detecting a color collision and falling back to an alternative BSS color plan in accordance with one embodiment.

FIG. 8 is a block diagram of an example computing component 800 for detecting a color collision and falling back to an alternative BSS color plan in accordance with one embodiment. Computing component 800, hardware processor 802, and machine readable storage medium 804 as depicted in FIG. 8 may be the same as that illustrated in FIG. 2 or similar thereto. In various embodiments, computing component 800 of FIG. 8 may be implemented in a radio in the network such as, for example, a radio in a client device or STA. Hardware processor 800 of the radio may execute instruction 814 to operate the radio in a wireless networking environment that includes a plurality of other radios such as, for example, and IEEE 802.11 wireless network. As described above, in various applications the radio may be operating at a given channel and be using an assigned BSS color during communications. For example, the assigned BSS color currently in use can be a default BSS color assigned to that radio as part of a default BSS color set assigned to a subgraph, $G_n$, of which that radio is a member.

Hardware processor 800 may execute instruction 816 to detect occurrence of a BSS color collision between the radio and another radio on the network. When all radios of the network receive the globally computed BSS color plan, no BSS color collision is expected provided that the chromatic number of the subgraph, $G_n$, is less than or equal to $N_c$. However, due to a variety of events such as channel change events, reconfigurations of the network without an update to the global BSS color plan, or BSS color collision with interfering radios outside of the network, BSS color collisions may occur.

Radios can detect when their assigned BSS color collides with a BSS color used by a neighboring radio. For example, in the IEEE 802.11ax, this can be determined from a BSS color collision report from its associated STAs, or by receiving frames from an OBSS STA containing the same BSS color. In some embodiments, for a collision to have occurred, the radio must observe a BSS color conflict over a certain predefined conflict duration. For example, the IEEE 802.11ax defines this period as having a minimum value of 50 seconds. When this occurs, in various implementations the radio shall stop using the then-current BSS color. Indeed, this is a requirement of IEEE 802.11ax.

IEEE 802.11ax does provide that the radio detecting the collision may switch to a different BSS color that does not conflict with a BSS color used by its neighboring radios. However, IEEE 802.11ax does not specify how the selection of a nonconflicting BSS color is to occur. In one embodiment, the change can be made at the end of or after the predefined conflict duration. In other embodiments, the change can be made as soon as the color conflict is detected or at any time prior to the end of the predefined conflict duration.

Accordingly, hardware processor 800 may begin to execute instructions to effectuate the switch to a new (e.g., default) BSS color if a collision is detected. As part of this process, Hardware processor 800 may execute instruction 818 to access a list of one or more alternative BSS colors assigned to the radio. For example, these can be the alternative BSS color colors assigned to the radio during the global BSS color assignment process in accordance with the examples described above. The list can be implemented, for example, as identification of one or more colors stored at an accessible location in memory, such as in machine-readable storage medium 804 or in other memory devices.

Hardware processor 800 may execute then instruction 820 to select a BSS color from the list of one or more alternative BSS colors and switch its radio to the selected BSS color. For a variety of reasons, there is a possibility that the radio might not otherwise be aware of the BSS colors used by its neighboring co-channel radios. Therefore, having a predetermined list of alternative BSS colors provides a way for the radio to select an effective fallback color without having to check the colors used by its neighboring co-channel radios in real time.

In selecting a BSS color to switch at the time of BSS color collision, the radio can choose one BSS color from the alternative BSS colors assigned, for example, from the central entity. The default or other than-current BSS color in use by the radio is replaced by the color selected from set of one or more alternative BSS colors. In various embodiments, the previous BSS color that the alternative BSS color replaces, can be added to the set of alternative BSS colors. In this way the probability of selecting a BSS color that may collide with the BSS colors used by its co-channel neighbors, is reduced even though the radio has not been able to collect complete BSS color usage information from its co-channel neighbors.

There can be a number of different techniques implemented to select a BSS color to switch to from a set of multiple alternative BSS colors. For example, the fallback BSS color can be selected at random from the alternative BSS colors in the list. As another example, the alternative BSS colors can be maintained in a queue, such as a FIFO, LIFO, etc. The BSS color at the head of the queue may be selected as the BSS color for operation and removed from the queue. The previous BSS color (that was in conflict) can be added back to the queue (e.g., at the end of the FIFO).

As yet another example, the BSS color to switch to can be selected based on a ranking of alternative BSS colors in the list. Further to this example, criteria that can be used to form the ranking may include criteria such as: BSS colors in the list with no known current color collisions; BSS colors in the list with no known historical color collision; BSS colors in the list with older color collision timestamps. Weights can be assigned to the colors based on one or more of these criteria were based on other criteria. In order to allow criteria such as this to be evaluated, embodiments may be implemented to maintain a history of BSS color collisions for each BSS color in the list. This might include, for example, a historical accounting for each color of the number of current BSS color collisions (1 or 0), the number of historical BSS color collisions (which may be bounded in time), and the latest BSS color collision time.

In various environments, radios in a wireless local area network may change channels reactively for a number of different reasons. For example, when a radio detects radar events, the radio may change its channel selection in accordance with certain timing requirements. In some applications, this may be dictated by regulatory requirements. Channel change events may be disruptive and can require additional BSS color assignments as well.

To reduce the scope of disruptions (e.g. the number of radios requiring new BSS color assignments under such circumstances), a set of BSS colors can be dedicated to a set of channels known or predicted to have a high quantity of radio events requiring channel changes. If BSS colors are set aside for these purposes, this can reduce the number of available BSS colors that can be used for alternative or fallback BSS color plants. However, a modification to allow dedicating a set of one or more BSS colors to a set of channels frequently disrupted by radio events may overwhelm disruptions from BSS color conflicts.

Consider an example in which the set of available BSS colors $S=\{1, 2, \ldots, 63\}$ and the set of available channels is C. Both sets can be split into K disjoint sets (partition of set). Partition of set S is $Y1, \ldots, YK$ and partition of set C is $X1, \ldots, XK$. There is a one-to-one mapping between Xi and Yi. For example, $X1=\{36, 40, 44, 48\}$ (UNII-1 channels) is mapped to $Y1=\{1, \ldots, 32\}$ while $X2=\{149, 153, 157, 161\}$ (UNII-3 channels) is mapped to $Y2=\{33, \ldots, 63\}$.

In one example, $X_1$ is the DFS channels and $X_2$ is the non-DFS channels. In another example, $X_1$ is the channels determined to experience events (e.g., with known DFS events over last 30 days) and $X_2$ is the channels not determined to experience events (e.g., with no known DFS events over last 30 days). The number of BSS colors mapped to each channel set can be a function of number of channels and frequency of channel change events. In yet another example, $X_1$ may be the channels that are known to detect radio events triggering immediate channel changes (e.g. radar or high noise causing beacon stuck), and $X_2=C-X_1$.

Figure 9:
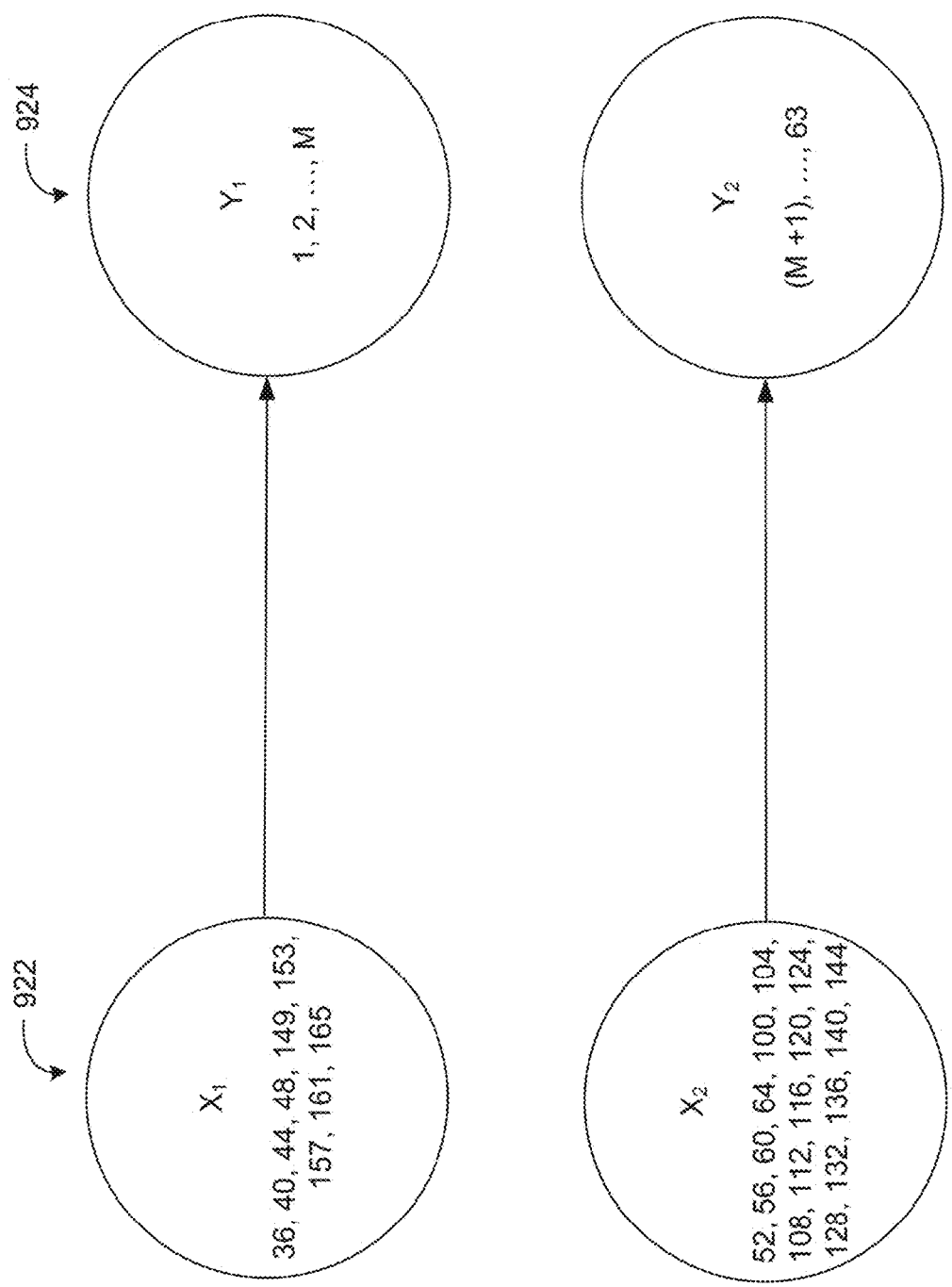
FIG. 9 illustrates an example of radio events aware BSS coloring for DFS and non-DFS channels in accordance with one embodiment.

FIG. 9 illustrates an example of radio events aware BSS coloring for DFS and non-DFS channels in accordance with one embodiment. In the example in FIG. 9, there are channels 922 and BSS colors 924. Specifically, $X_1$ represents a set of non-DFS channels and $X_2$, represents a set of DFS channels. When a radio detects radar events, it changes channel from one in $X_2$ to either one in $X_1$ or one in $X_2$. When it changes its channel to a channel in $X_1$, it does not need to change the BSS color. At the next global BSS color assignment, the BSS color will be reassigned based on the new operational channel.

Figure 10:
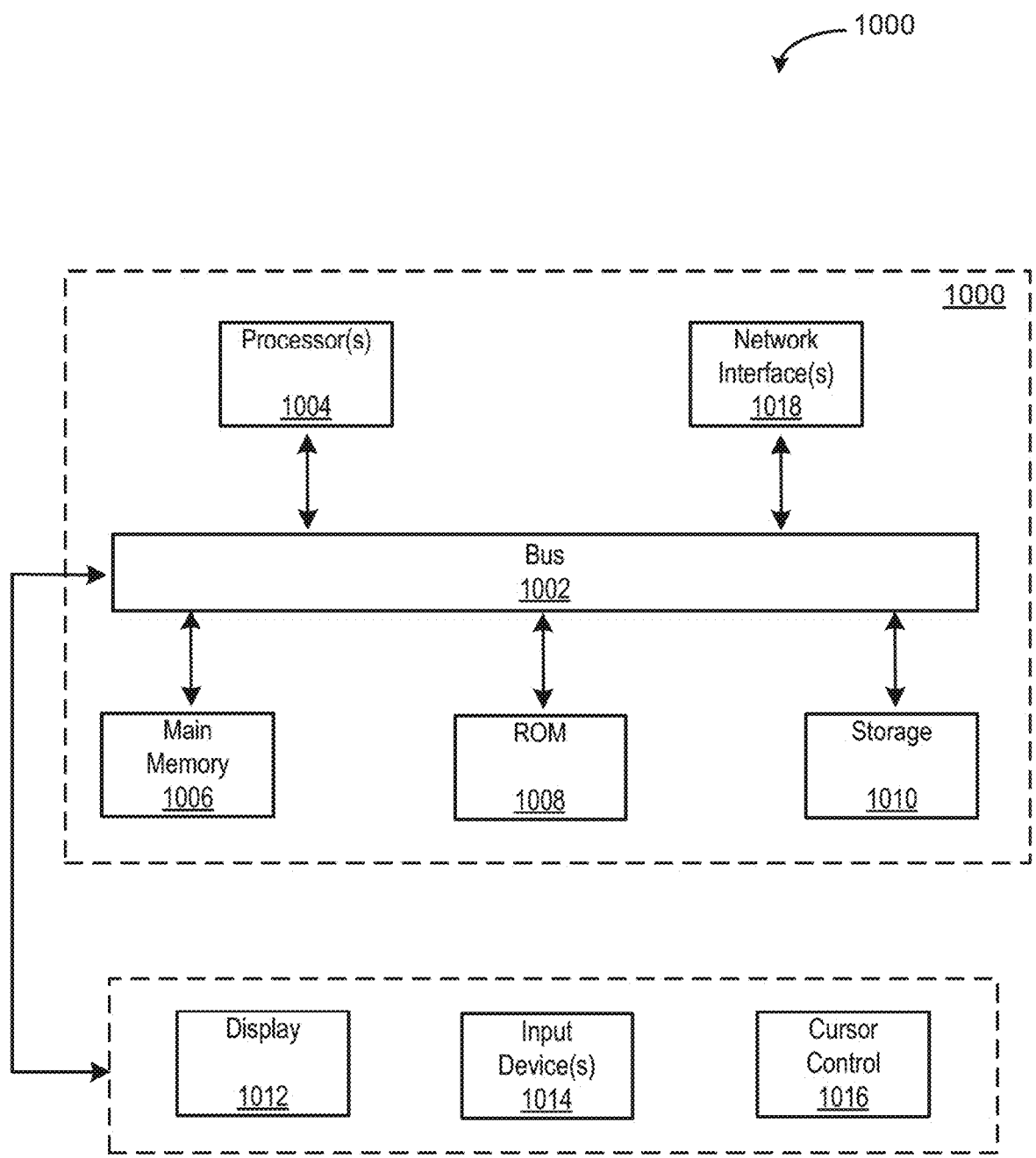
FIG. 10 is an example computing component that may be used to implement various features of embodiments described in the present disclosure.

FIG. 10 depicts a block diagram of an example computer system 1000 in which various of the embodiments described herein may be implemented. The computer system 1000 includes a bus 1002 or other communication mechanism for communicating information, one or more hardware processors 1004 coupled with bus 1002 for processing information. Hardware processor(s) 1004 may be, for example, one or more general purpose microprocessors.

The computer system 1000 also includes a main memory 1006, such as a random access memory (RAM), cache and/or other dynamic storage devices, coupled to bus 1002 for storing information and instructions to be executed by processor 1004. Main memory 1006 also may be used for storing temporary variables or other intermediate information during execution of instructions to be executed by processor 1004. Such instructions, when stored in storage media accessible to processor 1004, render computer system 1000 into a special-purpose machine that is customized to perform the operations specified in the instructions.

The computer system 1000 further includes a read only memory (ROM) 1008 or other static storage device coupled to bus 1002 for storing static information and instructions for processor 1004. A storage device 1010, such as a magnetic disk, optical disk, or USB thumb drive (Flash drive), etc., is provided and coupled to bus 1002 for storing information and instructions.

The computer system 1000 may be coupled via bus 1002 to a display 1012, such as a liquid crystal display (LCD) (or touch screen), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. In some embodiments, the same direction information and command selections as cursor control may be implemented via receiving touches on a touch screen without a cursor.

The computing system 1000 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor(s) 1004 executing one or more sequences of one or more instructions contained in main memory 1006. Such instructions may be read into main memory 1006 from another storage medium, such as storage device 1010. Execution of the sequences of instructions contained in main memory 1006 causes processor(s) 1004 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1010. Volatile media includes dynamic memory, such as main memory 1006. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1002. Transmission media can also take the form of acoustic or light waves, such as those generated during radio-wave and infra-red data communications.

The computer system 1000 also includes a communication interface 1018 coupled to bus 1002. Network interface 1018 provides a two-way data communication coupling to one or more network links that are connected to one or more local networks. For example, communication interface 1018 may be an integrated services digital network (ISDN) card, cable modem, satellite modem, or a modem to provide a data communication connection to a corresponding type of telephone line. As another example, network interface 1018 may be a local area network (LAN) card to provide a data communication connection to a compatible LAN (or WAN component to communicated with a WAN). Wireless links may also be implemented. In any such implementation, network interface 1018 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet" Local network and Internet both use electrical, electromagnetic or optical signals that carry digital data streams. The signals through the various networks and the signals on network link and through communication interface 1018, which carry the digital data to and from computer system 1000, are example forms of transmission media.

The computer system 1000 can send messages and receive data, including program code, through the network(s), network link and communication interface 1018. In the Internet example, a server might transmit a requested code for an application program through the Internet, the ISP, the local network and the communication interface 1018.

The received code may be executed by processor 1004 as it is received, and/or stored in storage device 1010, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 900.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

What is claimed is:

1. A non-transitory machine-readable storage medium encoded with instructions executable by a hardware processor of a computing component, the machine-readable storage medium comprising instructions to cause the hardware processor to:
   in a wireless local area network (WLAN) including a network graph representing radio neighbors, assign a frequency range and Equivalent Isotropically Radiated Power (EIRP) for each radio represented in the network graph;
   generate a subgraph of radios operating at the same frequency range;
   for the subgraph, determine a minimum number of basic service set (BSS) colors required to assign BSS colors to the subgraph without BSS color conflict;
   based on the minimum number of BSS colors, assign a default BSS color to each radio in the subgraph to avoid BSS color conflict among radios in the subgraph, wherein assigning comprises;
     for each neighbor radio discovered by a given radio, determine whether there is a color conflict;
     where there is a color conflict for a radio, calculate a first color conflict value based on vertices in the subgraph for the given radio;
     calculate a network color conflict value using the first color conflict computed for each radio; and
     minimize the network color conflict value; and
   based on remaining BSS colors, assign one or more alternative BSS colors to each radio in the subgraph.

2. The non-transitory machine-readable storage medium of claim 1, wherein the instructions to cause the hardware processor to generate a subgraph of radios operating at the same frequency range comprise instructions to cause the hardware processor to;
   identify a group of radios operating on a same channel;
   for each radio in the group of radios, identify a set of neighboring co-channels radios; and
   construct the subgraph comprising a plurality of vertices and a plurality of edges connecting pairs of vertices, wherein each vertex represents a radio in the identified group of radios, and each edge represents a radio-neighbor pair.

3. The non-transitory machine-readable storage medium of claim 2, the instructions further cause the hardware processor to filter the subgraph, either during creation of the subgraph or after the subgraph is created, to remove an edge between each radio-neighbor pair falling below a determined threshold.

4. The non-transitory machine-readable storage medium of claim 2, wherein the subgraph comprises a plurality of disjointed subgraph sections.

5. The non-transitory machine-readable storage medium of claim 1, wherein the instructions to cause the hardware processor to determine a minimum number of BSS colors comprises causing the hardware processor to compute a maximum vertex degree for the generated subgraph and determine the minimum number of BSS colors as one plus the determined maximum vertex degree.

6. The non-transitory machine-readable storage medium of claim 5, wherein the minimum number of BSS colors, $N_m$, needed to color the subgraph comprises:

$$N_m = \begin{cases} N_v + 1, & N_v + 1 \le N_c \\ N_c, & \text{otherwise} \end{cases}$$

where $N_c$ is the number of available BSS colors on the subgraph, and $N_v$ denotes the maximum vertex degree.

7. The non-transitory machine-readable storage medium of claim 1, the instructions further causing the hardware processor to determine a number of global BSS color plans, N, for the subgraph.

8. The non-transitory machine-readable storage medium of claim 7, wherein the instructions to cause the hardware processor to determine a number of global BSS color plans, N, for the subgraph cause the hardware processor to:
 compute a maximum vertex degree for the generated subgraph
 determine a number of global BSS color plans as a quantity of available BSS colors on the subgraph divided by the maximum vertex degree for the generated subgraph plus one color.

9. A method, comprising:
 in a wireless local area network (WLAN) including a network graph representing radio neighbors, assigning a frequency range and Equivalent Isotropically Radiated Power (EIRP) for each radio represented in the network graph;
 generating a subgraph of radios operating at the same frequency range;
 for the subgraph, determining a minimum number of basic service set (BSS) colors required to assign BSS colors to the subgraph without BSS color conflict;
 based on the minimum number of BSS colors, assigning a default BSS color to each radio in the subgraph to avoid BSS color conflict among radios in the subgraph, wherein assigning comprises:
  for each neighbor radio discovered by a given radio, determining whether there is a color conflict;
  where there is a color conflict for a radio, calculating a first color conflict value based on vertices in the subgraph for the given radio;
  calculating a network color conflict value using the first color conflict computed for each radio; and
  minimizing the first and second network color conflict values; and
 based on remaining BSS colors, assigning one or more alternative BSS colors to each radio in the subgraph.

10. The method of claim 9, wherein generating a subgraph of radios operating at the same frequency range comprises;
 identifying a group of radios operating on a same channel;
 for each radio in the group of radios, identifying a set of neighboring co-channels radios; and
 constructing the subgraph comprising a plurality of vertices and a plurality of edges connecting pairs of vertices, wherein each vertex represents a radio in the identified group of radios, and each edge represents a radio-neighbor pair.

11. The method of claim 10, further comprising filtering the subgraph, either during creation or after the subgraph is created, to remove an edge between each radio-neighbor pair falling below a determined threshold.

12. The method of claim 10, wherein the subgraph comprises a plurality of disjointed subgraph sections.

13. The method of claim 9, wherein determining a minimum number of BSS colors comprises computing a maximum vertex degree for the generated subgraph and determining the minimum number of BSS colors as one plus the determined maximum vertex degree.

14. The method of claim 13, wherein minimum number of BSS colors, $N_m$, needed to color the subgraph comprises:

$$N_m = \begin{cases} N_v + 1, & N_v + 1 \le N_c \\ N_c, & \text{otherwise} \end{cases}$$

where $N_c$ is the number of available BSS colors on the subgraph, and $N_v$ denotes the maximum vertex degree.

15. The method of claim 9, further comprising determining a number of global BSS color plans, N, for the subgraph.

16. The method of claim 15, wherein determining a number of global BSS color plans, N, for the subgraph comprises
 computing a maximum vertex degree for the generated subgraph
 determining a number of global BSS color plans as a quantity of available BSS colors on the subgraph divided by the maximum vertex degree for the generated subgraph plus one color.

* * * * *